United States Patent [19]

Servido et al.

[11] Patent Number: 5,183,483

[45] Date of Patent: Feb. 2, 1993

[54] PNEUMATIC CIRCUIT CONTROL FOR PRESSURE SWING ADSORPTION SYSTEMS

[75] Inventors: John L. Servido; Robert E. Tucker; James Murphy, all of Marietta, Ga.

[73] Assignee: Healthdyne, Inc., Marietta, Ga.

[21] Appl. No.: 743,776

[22] Filed: Aug. 21, 1991

[51] Int. Cl.5 ............................................. B01D 53/04
[52] U.S. Cl. .......................................... 55/26; 55/62; 55/68; 55/75; 55/161; 55/179; 55/389
[58] Field of Search .................... 55/25, 26, 33, 62, 68, 55/74, 75, 161–163, 179, 387, 389

[56] References Cited

U.S. PATENT DOCUMENTS

| | | | |
|---|---|---|---|
| 2,944,627 | 7/1960 | Skarstrom | 55/62 X |
| 3,069,830 | 12/1962 | Skarstrom et al. | 55/62 X |
| 3,186,150 | 6/1965 | Zankey | 55/62 X |
| 3,192,686 | 7/1965 | Berkey et al. | 55/33 X |
| 3,636,679 | 1/1972 | Batta | 55/62 X |
| 3,659,399 | 5/1972 | Kauer, Jr. et al. | 55/33 |
| 3,923,477 | 12/1975 | Armond et al. | 55/25 |
| 4,194,981 | 3/1980 | Earls et al. | 55/26 |
| 4,404,005 | 9/1983 | Hamlin et al. | 55/179 X |
| 4,449,990 | 5/1984 | Tedford, Jr. | 55/26 |
| 4,496,376 | 1/1985 | Hradek | 55/179 X |
| 4,545,790 | 10/1985 | Miller et al. | 55/179 X |
| 4,548,799 | 10/1985 | Knoblauch et al. | 55/26 X |
| 4,552,571 | 11/1985 | Dechene | 55/21 |
| 4,560,393 | 12/1985 | Way | 55/389 X |
| 4,721,515 | 1/1988 | Hata et al. | 55/179 X |
| 4,765,806 | 8/1988 | Doto | 55/33 X |
| 4,806,134 | 2/1989 | Lhota | 55/179 X |
| 4,812,148 | 3/1989 | Hata et al. | 55/179 X |

FOREIGN PATENT DOCUMENTS 2197801  6/1988  United Kingdom ..................... 55/25

Primary Examiner—Robert Spitzer
Attorney, Agent, or Firm—Foley & Lardner

[57] ABSTRACT

A pneumatic control circuit for a pressure adsorption swing system having two three-way valves which are connected at one end to a compressor and at a second end to first and second molecular sieves respectively. The three-way valves and the compressor are both located on the inlet side of the sieves such that they form a single control circuit for both the adsorption/-desorption phase and the balance phase of the pressure adsorption swing system. A method for controlling pneumatic flow in the pressure swing adsorption system is also described.

6 Claims, 2 Drawing Sheets

PNEUMATIC CIRCUIT CONTROL FOR PRESSURE SWING ADSORPTION SYSTEMS

BACKGROUND OF THE INVENTION

1. Field of the Invention

This invention relates to a pressure swing adsorption system for physically separating molecules in gaseous mixtures, and more particularly to a pneumatic circuit control for such a system.

2. Brief Description of the Related Art

Many processes for recovering oxygen and nitrogen from a feed gas such as air are known in the art. One such process is referred to as adsorption. In the adsorption process, the feed gas is fed into a molecular sieve having pores of uniform size and essentially the same molecular dimensions. These pores selectively adsorb certain molecules and not other molecules. Thus, for example, where air is used as the feed gas a molecular sieve in the form of zeolite might be used. The zeolites would adsorb nitrogen, carbon monoxide, carbon dioxide, water vapor and other significant components of air without adsorbing the oxygen. Accordingly, a very pure form of oxygen can be separated and obtained using the adsorption process. Similarly, where a very pure form of nitrogen is required, a molecular sieve with coke adsorbers might be used to adsorb the oxygen from the feed air, thereby producing a purer nitrogen product.

In a typical adsorption system, a plurality of beds are provided with each bed containing a molecular sieve. The plurality of beds is required because when one bed has become fully adsorbed, it will need to be desorbed before it can produce the product required at the purity level required. Consequently, in a conventional system, a valve control system is incorporated which introduces pressurized feed gas into one bed while simultaneously permitting the desorbing of the second bed via an exhaust valve. Thus, when the first bed is fully adsorbed, the valve control system switches so that the first bed is desorbed and the second bed adsorbs. By using this process, a continuous flow of product gas is supplied to a storage tank from the bed undergoing adsorption. The product gas which flows from a bed undergoing adsorption is typically divided such that part of the gas flows to a storage tank while the other part flows through the other bed to desorb that bed via an exhaust valve.

In addition to the adsorption and desorption phases described above, some systems incorporate a balance phase to improve the efficiency of the pressure swing adsorption system. During the balance phase, the pressures in the two beds are brought into balance prior to an adsorption/desorption phase. This allows the system to utilize the energy that is built up in the bed which has just completed the adsorption phase to help pressurize the bed which will next undergo adsorption. The balance phase increases the efficiency of the system since the compressor supplying the feed gas will not have to work as hard to bring the bed undergoing adsorption up to a required operating pressure.

In order to accomplish the above balancing, conventional systems such as those described in U.S. Pat. Nos. 4,449,990 and 4,560,393 require independent valves and pneumatic circuits at the exit end (opposite the compressor side) of the tanks or beds. Accordingly, these systems are costly, require a large number of pressure connections, and have reliability and noise problems due to the large number of valves and associated moving parts that are required. For example, it is known to use five two-way valves in a two bed system to perform the adsorption/desorption phase and the balancing phase. Four of the two-way valves serve as the inlet and exhaust ports for the beds or tanks, while the fifth two-way valve serves as a "balancing" valve located opposite the compressor side of the tanks.

In other known systems, the above phases can be accomplished using two four-way valves, or a four-way valve and a two-way valve, or a three-way valve and three two-way valves.

What the current art of pressure swing adsorption systems lacks is a pneumatic control circuit which requires less valves and has a single control circuit on the compressor side of the bed or tanks for performing both the adsorption/desorption phase and the balance phase, in order to achieve a more economical and reliable control system.

SUMMARY OF THE INVENTION

An object of the invention is to produce a pneumatic control circuit for a pressure adsorption swing system which uses a reduced number of valves to perform the adsorption/desorption phase of the system as well as the balancing phase.

Yet another object of the invention is to provide a control circuit with a simplified valving arrangement such that common hoses can be used, less pressure connections are required, reliability is increased, and system noise level is decreased.

In accordance with a first aspect of the invention, the above objectives are met by a pneumatic control circuit having a compressor which supplies pressurized feed gas to two molecular sieves via two three-way valves one at a time, respectively. The three-way valves are operable such that they can receive feed gas from the compressor or be switched to prevent the feed gas from flowing through the valve. The molecular sieves are capable of adsorbing molecules from the feed gas to produce a product gas, a part of which can be transferred between molecular sieves via a control line. During an adsorption/desorption phase, one three-way valve is in an open position to permit the flow of a gas to one of the molecular sieves wherein a product gas is produced. A portion of the product gas is used to purge adsorbed molecules in the second molecular sieve and both the product gas and molecules are exhausted via an exhaust port in the second three-way valve. A feed gas inlet port of the second three-way valve is closed to prevent feed gas from entering therein. In this phase, the pressure in the sieve receiving the feed gas becomes higher than the sieve which does not receive the feed gas.

In a balancing phase, both three-way valves are in an open position which allows feed gas from the compressor as well as gas from the high pressure sieve to flow into the low pressure molecular sieve thereby balancing the pressure in each sieve. At the same time, the exhaust ports of the three-way valves are closed.

Still another object of the invention is to provide a method for controlling pneumatic flow in a pressure swing adsorption system. This object is accomplished by a method whereby a feed gas is supplied via a first three-way valve to a first molecular sieve, the molecular sieve adsorbing selected molecules to produce a product gas. A portion of the product gas is used to purge adsorbed molecules from a second sieve and the product gas and molecules are exhausted via a second three-way valve. At the completion of this phase the pressure in the first sieve is higher than the pressure in the second sieve. Subsequent to this phase, a balancing phase is performed where the feed gas is supplied to the second sieve via a three-way valve in order to balance the pressure in both sieves. The process is then repeated with the sieves alternating between adsorption and desorption phases.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects, features and advantages of the present invention will become apparent from the following detailed description and accompanying drawings wherein.

DETAILED DESCRIPTION OF THE PREFERRED EMBODIMENTS

Figure 1:
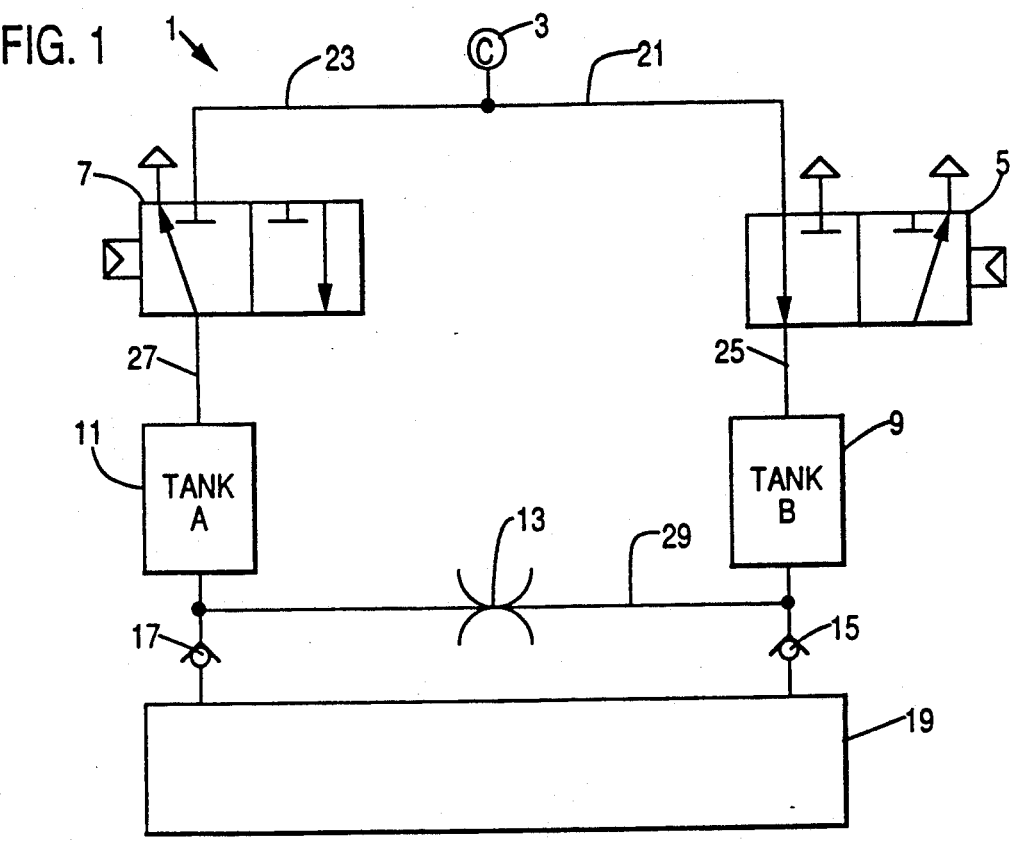
FIG. 1 is a schematic view of the pneumatic control circuit where tank A is being purged (desorbed) and tank B is being pressurized (adsorbed)

Referring to FIG. 1, the pneumatic control circuit generally indicated at 1 includes a compressor 3, two three-way valves 5, 7, two tanks 9, 11 having contained therein molecular sieves (not shown), a restrictor orifice 13, two check valves 15, 17 and a storage tank 19.

Compressor 3 is in communication with three-way valves 5, 7 via lines 21, 23, respectively. Three-way valves 5, 7 are in turn in communication with tanks 9, 11 via lines 25, 27 respectively. Additionally, line 29 permits tank 9 to be in communication with tank 11 through restrictor orifice 13 so that the flow of product gas between tanks 9, 11 can be regulated. Tanks 9, 11 are in communication with check valves 15, 17 respectively, which in turn are connected to storage tank 19.

The operation of the pneumatic control circuit in the mode illustrated in FIG. 1 is as follows. The compressor 3 intakes, for example, ambient air and pumps the air via line 21 through three-way valve 5 into tank 9 where nitrogen or oxygen can be adsorbed depending on the molecular sieve used. At the same time, the feed gas inlet port of three-way valve 7 is closed thereby precluding air from flowing from the compressor 3 into tank 11 via line 23 and three-way valve 7. The oxygen or nitrogen (whichever is not adsorbed in the sieve) is referred to as product gas and it flows out of tank 9 and subsequently is split into two portions. A first portion flows through check valve 15 into storage tank 19 where it is stored. The check valve 15 allows the product gas to flow into the storage tank when the pressure of the product gas coming from tank 9 is greater than the pressure in storage tank 19, but precludes the product gas from flowing out of the storage tank 19 even if the pressure in the storage tank 19 is higher than the product gas pressure within tank 9.

A second portion of the product gas flows via line 29 into tank 11, with the flow of this second portion being determined by the product gas pressure and the restrictor orifice 13. The portion of product gas flowing through tank 11 acts to desorb tank 11 of certain of the molecular products contained therein, and the molecular products and product gas are subsequently vented out via an exhaust port of the three-way valve 7.

Figure 2:
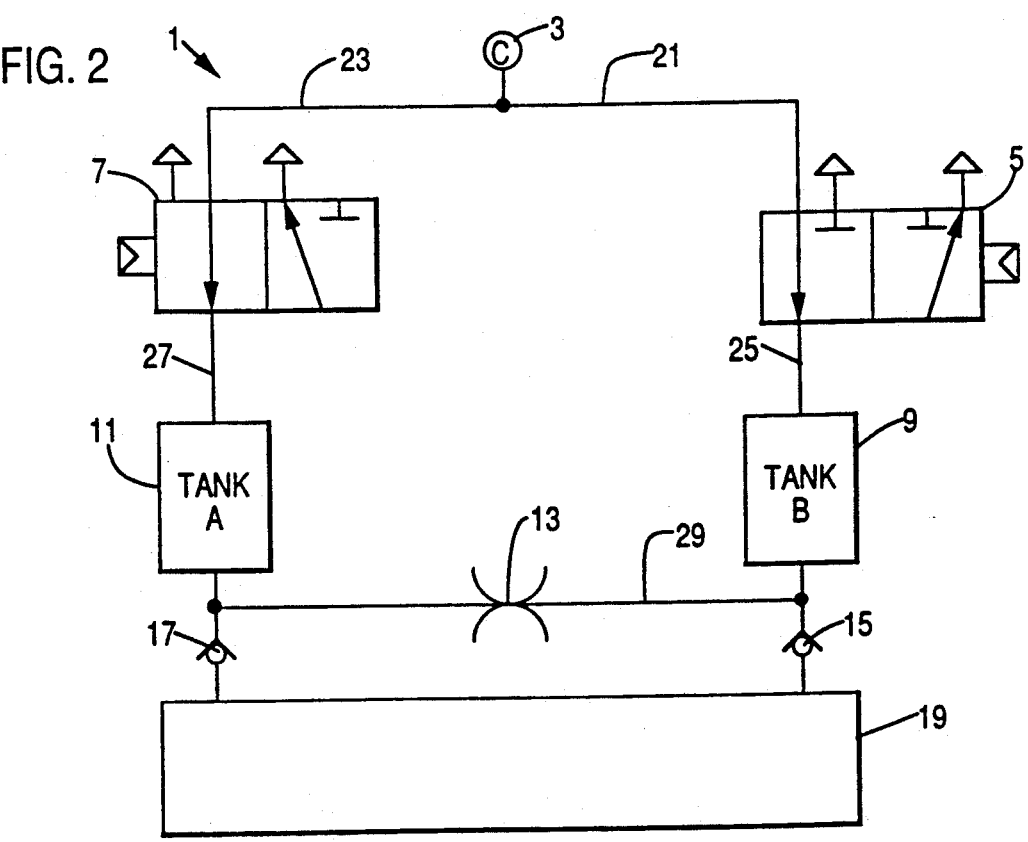
FIG. 2 is a schematic view of the pneumatic control circuit in a balancing phase.

When tank 9 is fully adsorbed, the pneumatic control circuit will switch for approximately 1 second to the balance phase which is depicted in FIG. 2. In this phase, the feed gas inlet ports in both three-way valves 5, 7 are in open positions thereby allowing pressured air from compressor 3 and tank 9 to pass through valve 7 and into tank 11. The pressure in tank 9, which just prior to the balance phase is at its highest value in the FIG. 1 mode just described, is reduced approximately in half and the pressure in tank 11 balances at approximately this same pressure. Accordingly, approximately half of the energy built up in the previous phase has been saved which leads to substantial energy efficiency savings since the compressor has less work to perform to bring the pressure in tank 11 up to the operating pressure for the adsorption phase. During the balancing phase, the exhaust ports of the three-way valves 5, 7 are of course closed.

Figure 3:
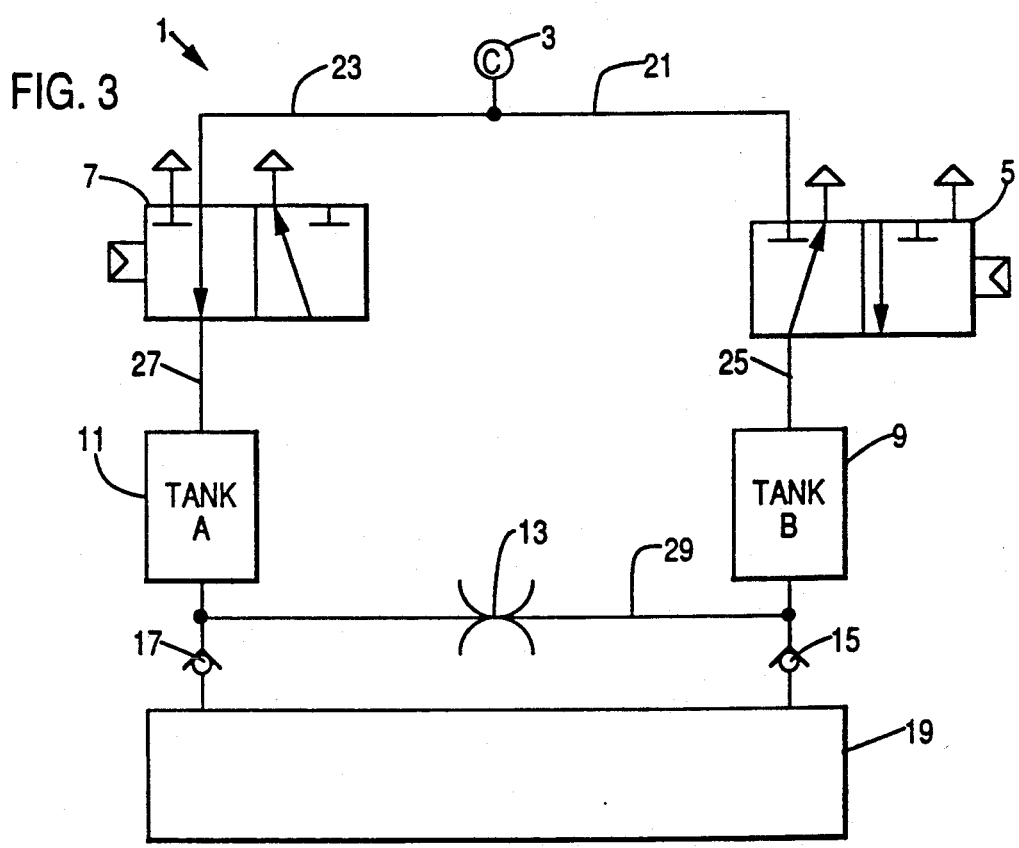
FIG. 3 is a schematic view of the pneumatic control circuit where tank B is being purged and tank A is being pressurized.

FIG. 3 represents a mirror image of the adsorption/desorption cycle as described for FIG. 1 except that the feed gas inlet port of valve 7 is open, and the feed gas inlet port of valve 5 is closed. Thus, tank 11 will be pressurized while tank 9 will be purged.

The pneumatic control circuit 1 is a combination of conventional components which are per se known in the art and therefore the drawings are shown schematically. The three-way valves consist of three ports, a feed gas inlet port which is connected to the compressor, a second port which is connected to a tank and a third port which is in communication with the atmosphere and acts as an exhaust port. An example of these type valves is the ¼" diaphragm valve, #250a, produced by Humphrey Manufacturing. The types of molecular sieves which can be used are varied in nature and known to those possessing ordinary skill in the art.

The above described embodiment would operate in a typical system environment wherein the product gas produced is approximately 88–95% pure, the compressor operates in a range of approximately 15–30 psi (preferably 21 psi), the output pressure from the storage tank is approximately 6 psi and the average output of product gas is approximately 5 liters per minute.

As can be seen by the embodiment, a simplified pneumatic control circuit for a pressure swing adsorption system has been achieved which requires only two three-way valves located on the compressor side of the tanks. The reduction in the number of valves and the complexity of the valves used as compared to prior art pneumatic control systems represents a significant advance in the art. The inventive pneumatic control circuit can be produced at less cost, and is less noisy and more reliable than prior art systems, particularly since only a single control circuit is required as contrasted to the prior art where a control circuit was required on both the compressor side of the tanks as well as the opposite side thereof in order to accomplish both the pressurizing/purging cycle and the balance cycle, respectively.

While a single embodiment of the invention has been described, it will be understood that it is capable of still further modifications, and this application is intended to cover any variations, uses or adaptions of the invention, following in general the principles of the invention and including such departures from the present disclosure as to come within the knowledge of customary practice in the art to which the invention pertains, and as may be applied to the essential features hereinbefore set forth and following within the scope of the invention or the limits of the appended claims.

What is claimed is:

1. A method for controlling pneumatic flow in a pressure swing adsorption system including first and second molecular sieves, each having input and output sides, which selectively adsorb gas components of a feed gas, the method comprising the steps of:
   a) supplying a feed gas from a compressor to said input side of one of said first and second molecular sieves via a first three-way valve connected to said input side of said one of said first and second sieves, said first sieve adsorbing selected gas molecules from said feed gas to produce a product gas;
   b) supplying said product gas to said second sieve;
   c) purging previously adsorbed gas molecules in said second sieve using said product gas, and exhausting said product gas and said previously adsorbed gas molecules via a second three-way valve which is connected to the inlet side of the other of said first and second molecular sieves;
   d) when said first sieve reaches its molecular adsorption capacity, only supplying the input side of said second sieve with feed gas from said compressor and said first sieve to balance the pressure in said first and second molecular sieves; then
   e) repeating steps a-d except that said second sieve initially receives feed gas via said second three-way valve and produces said product gas while said first sieve is purged of said adsorbed gas molecules via said first three-way valve.

2. The method according to claim 1, further comprising the step of locating said compressor on the input side of said sieves, said product gas exiting said sieves on the output side thereof.

3. The method according to claim 2, wherein step (d) occurs in approximately one second.

4. A pneumatic control circuit for a pressure adsorption swing system, comprising;
   a compressor;
   first and second three-way valves, each of said three-way valves being pneumatically connected to said compressor;
   first and second molecular sieves each having an input side and an output side, the input sides of said first and second sieves being pneumatically connected to said first and second three-way valves, respectively;
   means for connecting said output side of said first molecular sieve to said output side of said second molecular sieve, said connecting means not including a valve;
   means for controlling said first and second valves for movement into open and closed positions relative to said compressor;
   wherein during an adsorption/desorption phase, said first valve is in an open position relative to said compressor to receive a feed gas from said compressor and to supply said feed gas to said first sieve, said first sieve adsorbs certain gas molecules and produces a product gas which flows to said second sieve via said connecting means, said product gas purging previously adsorbed gas molecules in said second sieve outwardly from said second three-way valve; and
   wherein during a balancing phase, both said first and second valves are in an open position relative to said compressor, said second sieve being balanced by receiving said feed gas from said compressor and said first sieve only through said second valve and said input side of said second sieve, whereby the pressure in each of said first and second sieves becomes balanced thereby saving energy when the adsorption/desorption phases are shifted subsequent to balancing.

5. A pneumatic control circuit according to claim 4, wherein during said balancing phase said balancing pressure is approximately one half the pressure produced in said first sieve at the end of said adsorption/desorption phase.

6. A pneumatic control circuit for a pressure adsorption swing system, comprising:
   means for supplying a feed gas;
   first and second three-way valves, each of said three-way valves having first and second ports and being connected to said supplying means via respective said first ports;
   first and second molecular sieves each having an input side and an output side, the input side of said first and second molecular sieves being connected to said first and second three-way valves, respectively;
   means for connecting an output side of said first molecular sieve to an output side of said second molecular sieve;
   means for controlling said first and second three-way valves such that a respective one of said first and second ports of said first three-way valve is closed, while the other of said first and second ports of said first three-way valve is open, and a respective one of said first and second ports of said second three-way valve is closed while the other of said first and second ports of said second three-way valve is open;
   wherein during an adsorption/desorption phase, said first port of said first three-way valve is open relative to said supplying means to receive said feed gas from said supplying means and to supply said feed gas to said first sieve, said first sieve adsorbs certain gas molecules and produces a product gas flow which flows to said second sieve via said connecting means, said product gas purging previously adsorbed gas molecules in said second sieve outwardly through said second port of said second three-way valve;
   wherein during a balancing phase, both of said first ports are open, said second sieve is balanced by receiving said feed gas from said compressor and said first sieve only via said input side of said second sieve, whereby the pressure in each of said first and second sieves becomes balanced thereby saving energy when the adsorption/desorption phases are shifted subsequent to balancing.

* * * * *